United States Patent [19]

Dixon et al.

[11] 4,012,020
[45] Mar. 15, 1977

[54] AUTOMOBILE AIR CONDITIONING SYSTEM

[75] Inventors: Don P. Dixon; George B. Kobel, both of San Antonio, Tex.

[73] Assignee: DPD Mfg. Co., Inc., San Antonio, Tex.

[22] Filed: Apr. 25, 1975

[21] Appl. No.: 571,505

Related U.S. Application Data

[62] Division of Ser. No. 488,735, July 15, 1974, Pat. No. 3,978,814.

[52] U.S. Cl. ............................ 248/14; 74/242.13 R
[51] Int. Cl.² ..................... F04B 39/00; F25B 1/00
[58] Field of Search ........................ 248/14, 23, 15; 74/242.13 R, 242.12; 417/362; 62/227; 123/195 A, 41.44

[56] References Cited

UNITED STATES PATENTS

| | | | |
|---|---|---|---|
| 1,191,553 | 7/1916 | Baldwin | 74/242.13 R X |
| 1,511,336 | 10/1924 | Hoey | 248/23 |
| 3,113,753 | 12/1963 | Doherty | 248/23 |
| 3,494,540 | 2/1970 | Dixon | 62/227 X |

FOREIGN PATENTS OR APPLICATIONS 740,318    8/1966    Canada ................. 248/23

*Primary Examiner*—J. Franklin Foss
*Attorney, Agent, or Firm*—W. F. Hyer; Marvin B. Eickenroht

[57] ABSTRACT

An air conditioning system for a Dasher or Audi-Fox automobile wherein a compressor is mounted on a bracket bolted to tapped holes in the right side of the engine block.

7 Claims, 5 Drawing Figures

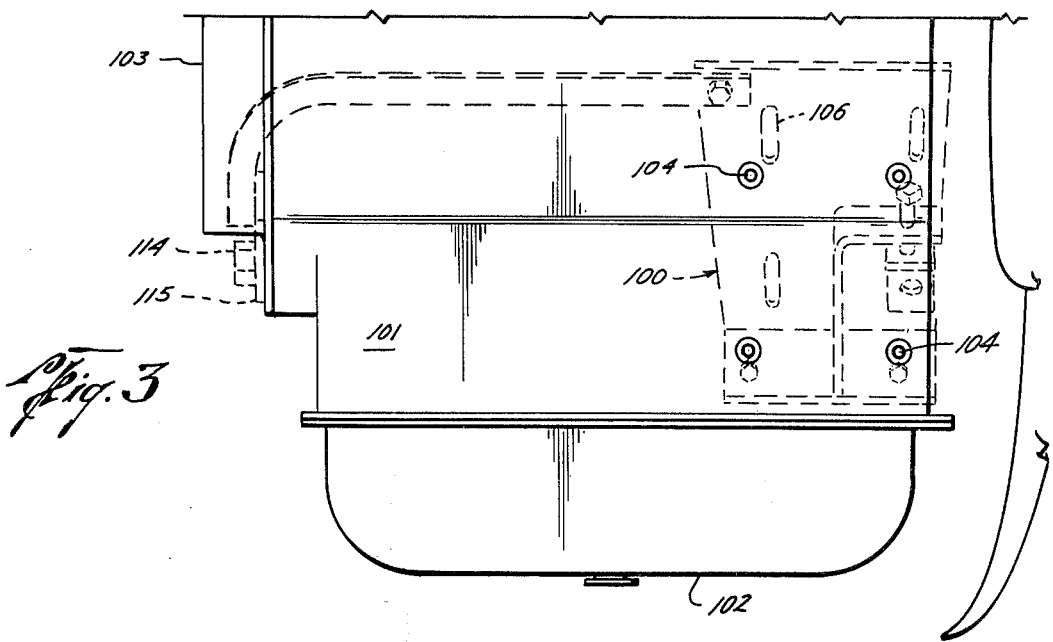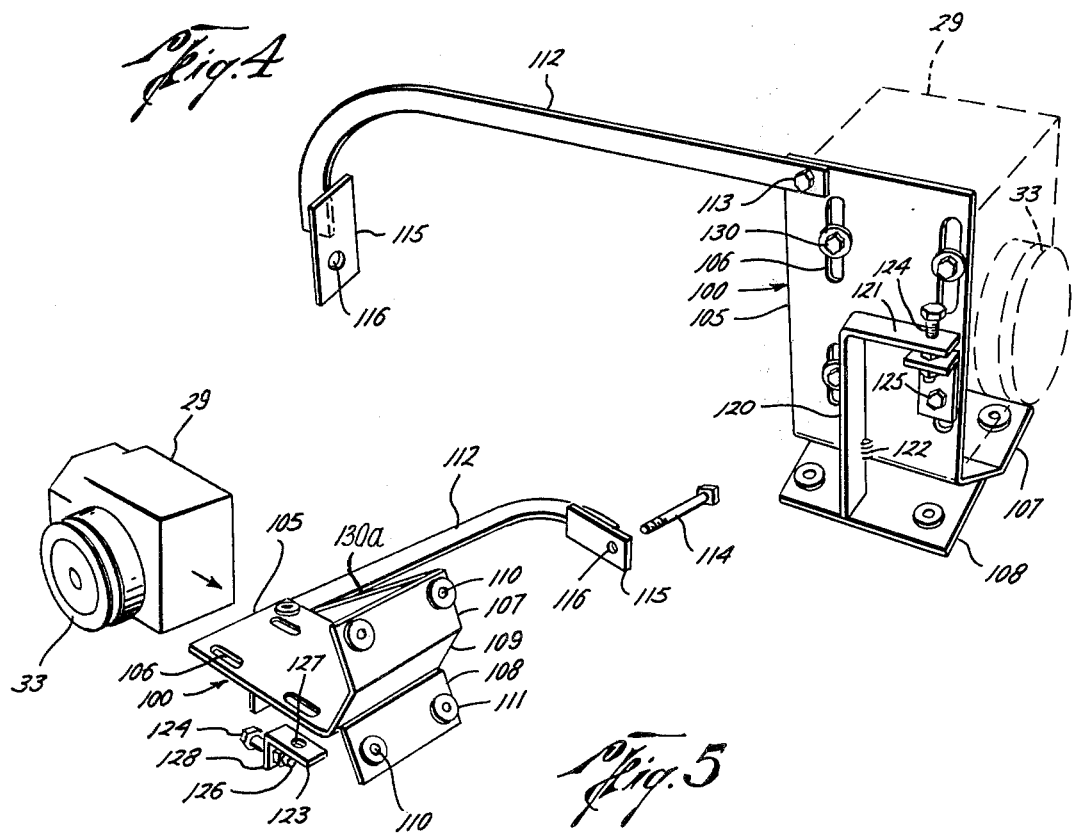

AUTOMOBILE AIR CONDITIONING SYSTEM

This is a division of application Ser. No. 488,735, filed on July 15, 1974, by Don P. Dixon and George B. Kobel, and entitled Automobile Air Conditioning System, now U.S. Pat. No. 3,978,814.

This invention relates generally to an air conditioning system for a 1973–74 Audi-Fox or a 1974 Dasher automobile. Space for non-factory installed equipment, and especially the components of an air conditioning system, is at a premium in automobiles of this type. Therefore, difficulties are encountered in installing such components without considerable alteration of existing parts of the automobile and/or use of extensive mounting parts, all of which add to the cost of installation.

An object of this invention is to provide such a system in which the compressor is mounted in a readily accessible area by means of a bracket connected to the engine block by existing tapped holes.

Yet another object is to provide such a system in which the bracket is firmly braced with a minimum number of additional parts or alteration of existing parts of the automobile.

A further object is to provide such a bracket which is of relatively inexpensive construction and easy to install, and further which facilitates adjustment of the position of the compressor for adjusting tension in the belt driving the compressor.

In the drawings, wherein like reference characters are used throughout to designate like parts:

FIG. 3 is a diagrammatic illustration of the right side of the engine block of the automobile, looking up and to the right, showing in broken lines the bracket from mounting the compressor thereon and the rod for bracing the bracket;

FIG. 4 is a perspective view of the bracket and bracing rod, as seen from the bottom and right and front end thereof, and showing the compressor in broken lines; and FIG. 5 is an exploded view of the bracket and compressor, as seen from the top and left side thereof.

Figure 1:
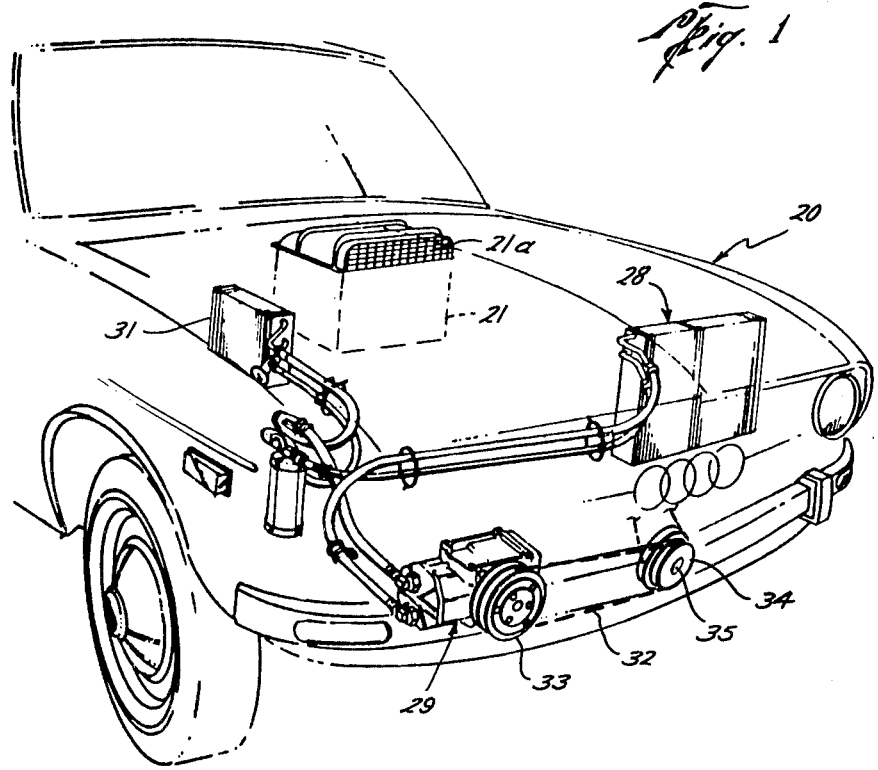
FIG. 1 is a perspective view of the front end of a 1973–74 Audi Fox or 1974 Dasher automobile, shown in phantom and with the components of an air conditioning system constructed in accordance with the present invention shown in solid lines in approximately the positions they occupy when installed therein.
Figure 2:
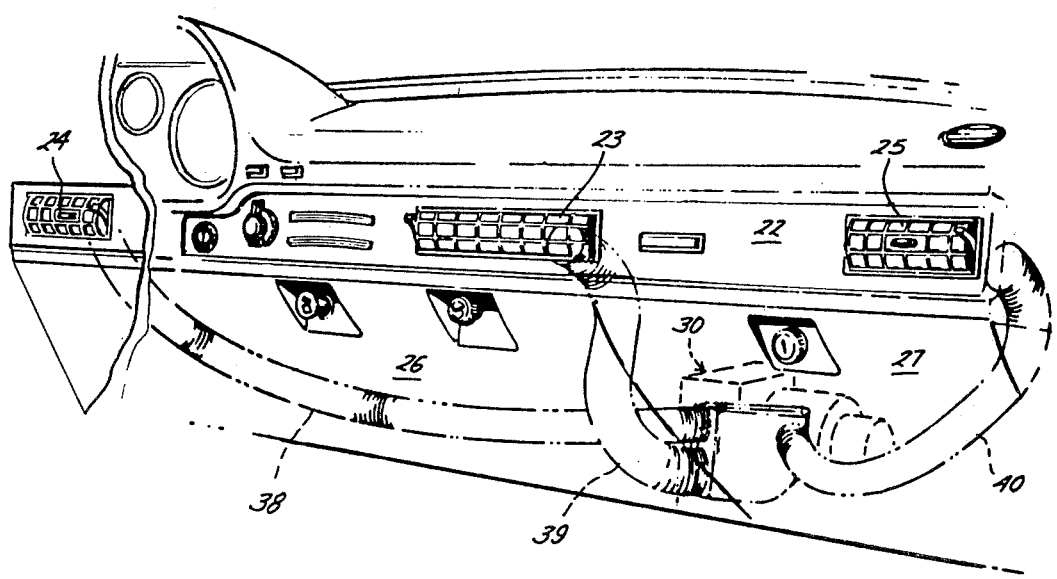
FIG. 2 is a perspective view of the front of the passenger compartment of the automobile, showing in broken lines the evaporator assembly of the air conditioning system and the hoses which connect it to ducts in the dash.

With reference now to the details of the above-described drawings, the 1973–74 Audi-Fox or 1974 Dasher automobile shown in FIG. 1, and designated in its entirety by reference character 20, has its engine mounted beneath a hood in the front, and a radiator mounted on its left side (with respect to the forward direction of movement of the automobile) behind a ventilated grill across the front end of the engine. Air is admitted to a housing 21 within the passenger compartment through an inlet 21a beneath the hood but above a horizontal bottom wall of the dash, which, as best shown at 22 in FIG. 2, extends laterally across the front of the passenger compartment. As also shown in FIG. 2, there is a center panel 26 beneath the dash, and a glove compartment 27 beneath the dash intermediate the center panel 26 and the right side wall of the automobile.

The components of the air conditioning system include a condenser 28 mounted behind a ventilated grill on the front face of the radiator of the automobile, a compressor 29 mounted on the right side of the engine block of the automobile, and an evaporator assembly 30 including a housing containing a coil 31 mounted entirely within the passenger compartment between the housing 21 and the right side wall of the automobile behind the glove compartment 27. As indicated in FIG. 1, and as well known in the art, these as well as other components of the air conditioning system are fluidly connected by hoses to permit a refrigerant to be circulated therethrough, so that cooled air from the evaporator may be circulated into the passenger compartment through ducts 23, 24 and 25 in the dash. As shown in FIG. 1, the compressor 29 is operated by a pulley 32 connecting a sheave 33 on its front side with a sheave 34 driven by crank shaft 35 of the automobile.

As shown in FIGS. 3 to 5, compressor 29 is mounted on a bracket 100 adapted to be connected to the right side wall 101 of the engine block of the automobile above the oil pan 102 and forwardly of flywheel housing 103 connected to a rear wall of the engine block. As previously described, and as shown in FIG. 3, there are four existing tapped holes 104 in the forward portion of the side wall 101, in an area generally beneath the air cleaner (not shown). These tapped holes are arranged in a generally rectangular pattern, with the upper and lower pairs being formed in portions of the side wall of the engine block which are parallel but laterally offset with respect to one another. More particularly, both walls are generally vertical, with the lower portion being disposed somewhat outwardly of the upper portion. As will be described below, upon removal of the air cleaner, the area adjacent these tapped holes is accessible for installation of the mounting bracket in position to support the compressor 29 with its sheave 33 laterally aligned with sheave 34 to receive the pulley 32, as described in connection with FIG. 1.

Bracket 100 includes a base plate 105 which is flat and generally rectangular in shape and, upon mounting of the bracket, with its flat top side supporting the bottom side of the compressor. More particularly, the base plate is provided with slots 106 extending longitudinally thereof, and thus generally laterally of the automobile when the bracket is connected thereto. The bracket is so mounted by mounting means which includes first and second mounting plates 107 and 108, respectively, connected by an intermediate plate 109. As shown, the mounting plates are disposed in planes which are parallel but spaced from one another, and which extend at an acute angle with respect to the upper side of the base plate 105.

More particularly, the plates are spaced from one another a distance substantially equal to the spacing of the portions of the side wall 101 of the engine block, and extend at angles substantially equal to those which said wall portions form with respect to the horizontal. Thus, with the plates 107 and 108 fitting adjacent the upper and lower portions of the side wall 101, respectively, the supporting surface of the base plate 105 and thus the bottom side of the compressor are generally horizontal. Each of the plates 107 and 108 has a pair of holes 110 formed therein, each for alignment with one of the tapped holes 104 in the side wall of the engine block so as to receive mounting bolts (not shown).

Rubber grommets 111 may be disposed between the adjacent sides of the plates 107 and 108 and the side walls of the engine block so as to reduce vibration.

As shown, the intermediate plate 109 is bent upwardly and away from the base plate 105, the upper mounting plate 107 is bent back toward the base plate 105, and the lower mounting plate 108 is welded to the back side of the intermediate plate 109 for extension downwardly and away from plate 105. Consequently, the compressor 29 is supported on a level intermediate the upper and lower edges of the mounting means, but closer to the lower pair of holes 104 than the upper pair.

When so connected to the engine block, the bracket 100 is braced by means of a rod or arm 112 connected at one end to the base plate of the bracket and at its opposite end to the engine block. More particularly, a hole was formed in the base plate 105 near its outer, rear corner so as to receive a bolt 113 for connecting the forward end of the arm to the bracket, and the opposite, rear end of the arm is connected to the engine block by means of a bolt 114 which extends through a bolt hole in the lower right corner of the flywheel housing 103 to connect it to a rearwardly facing wall of the engine block. Thus, the rear end of the arm 112 is connected to the engine block by means of an existing tapped hole in the block, although it may be necessary or desirable to replace the bolt originally used for connecting the flywheel housing with a longer one.

The arm 112 is bent intermediate its ends, with its forward portion extending from the bracket between the frame of the automobile and the starter motor. Thus, from its forward end to the bend, the forward portion of the rod extends inwardly at a relatively small angle. The arm bends inwardly to dispose its rearward portion at about 90° with respect to its forward portion. Thus, a plate 115 on its rearward end is adapted to fit against the rearwardly facing side of the flywheel housing, with a hole 116 therein extending generally parallel to its forward portion to receive the bolt 114.

A bar 120 connected to the bottom side of the base plate 105 includes a portion 121 extending laterally of the base plate generally intermediate its ends and extending from generally the mid-portion thereof to its forward edge. The bar also includes a longitudinally extending portion 122 which extends from the inner end of portion 121 to connection with the lower mounting plate 108. Thus, in addition to the function to be described, the bar 120 provides an additional brace for the bracket, particularly in supporting the base plate from the mounting plate 108.

The laterally extending portion 121 of the bar 120 also serves to support plate 123 in position to receive an adjusting screw 124. The compressor 121 is connected to plate 123 by means of a bolt 125 to permit it to be adjusted endwise of the bracket, and thus permit adjustment of the tension in the belt or pulley connecting the compressor with the crank shaft.

Thus, as shown, the adjusting plate 123 includes a horizontally extending flange 126 adapted to be slidable against the bottom side of the mounting plate 105, and having a hole 127 formed therein to receive the bolt 125, and a vertically extending plate 128 disposed on the inner side of the flange 121. The plate 128 has a threaded hole therein which receives the end of the adjusting screw 124, so that the adjusting screw may be rotated for moving the compressor either toward or away from the right side of the engine block. During this adjustment, of course, not only the bolt 125, but other bolts 130 extending through the other slots 106 are loosened.

As shown in FIG. 5, the connecting of the base plate to the mounting means is further braced by an arm 130a extending between the corner of the base plate near bolt 113 and the upper rearward corner of mounting plate 107. The disposal of this arm on the rearward side of the base plate provides a means to which an end of arm 112 may be connected, if desired.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A bracket for mounting the compressor of an air conditioning system within an automobile, comprising a base plate having one side for supporting the compressor and slots therethrough to receive bolts for connection to the one side of the compressor, and means for mounting the base plate on the engine block of the automobile, including first and second mounting plates, and an intermediate plate connecting the mounting plates in generally parallel offset planes, only one of the plates of said mounting means being directly connected to one end of the base plate with the first and second mounting plates extending at an acute angle thereto, and each of said mounting plates having bolt holes therethrough.

2. A bracket for mounting the compressor of an air conditioning system within an automobile, comprising a base plate having one side for supporting the compressor and slots therethrough to receive bolts for connection to the one side of the compressor, means for mounting the base plate on the engine block of the automobile, including first and second mounting plates, and an intermediate plate connecting the mounting plates in generally parallel offset planes, one of the plates of said mounting means being connected to one end of the base plate with the first and second mounting plates extending at an acute angle thereto, and each of said mounting plates having bolt holes therethrough, and including a bracing arm connecting one of the mounting plates with the base plate along one side edge thereof.

3. A bracket of the character defined in claim 2, wherein said bar has another portion extending longitudinally from the laterally extending portion to connection with said mounting means.

4. A bracket for mounting the compressor of an air conditioning system within an automobile, comprising a base plate having an upper side for supporting the compressor and slots therethrough to receive bolts for connection to the bottom of the compressor, and means for mounting the base plate on the engine block of the automobile, including first and second mounting plates, and an intermediate plate connecting the mounting plates in generally parallel offset planes, said mounting means being connected to one end of the base plate with the first and second mounting plates extending at an acute angle thereto, and each of said mounting plates having bolt holes therethrough, a bar on the lower side of the base plate having a portion extending laterally intermediate its ends, an adjusting plate having a horizontal flange with a hole therethrough alignable with a slot in the base plate to receive a bolt connecting the compressor to the base plate, and a vertical flange parallel to the laterally extending bar portion, said bar and vertical flange having aligned holes, and an adjusting screw received through the aligned holes for moving the adjusting plate and the compressor endwise of the base plate.

5. A bracket for mounting the compressor of an air conditioning system within an automobile, comprising a base plate having one side for supporting the compressor and slots therethrough to receive bolts for connection to one side of the compressor, and means for mounting the base plate on the engine block of the automobile, including first and second mounting plates, and an intermediate plate connecting the mounting plates in generally parallel offset planes, said mounting means being connected to one end of the base plate with the first and second mounting plates extending at an acute angle thereto, and each of said mounting plates having bolt holes therethrough, a bar on the other side of the base plate having a portion extending laterally intermediate its ends, an adjusting plate having a horizontal flange with a hole therethrough alignable with a slot in the base plate to receive a bolt connecting the compressor to the base plate, and a vertical flange parallel to the laterally extending bar portion, said bar and vertical flange having aligned holes, and an adjusting screw received through the aligned holes for moving the adjusting plate and the compressor endwise of the base plate.

6. A bracket of the character defined in claim 5, wherein said bar has another portion extending longitudinally from the laterally extending portion to connection with one of the mounting plates of said mounting means.

7. A bracket of the character defined in claim 6, including a bracing arm connecting the other of the mounting plates with the base plate along one side edge thereof.

* * * * *